March 4, 1952    F. H. ROHRBACH    2,587,764
RHUBARB CLEANING MACHINE

Filed Jan. 4, 1950    2 SHEETS—SHEET 1

Fred H. Rohrbach
*INVENTOR.*

BY *Clarence A. O'Brien
and Harvey B. Jacobson*
*Attorneys*

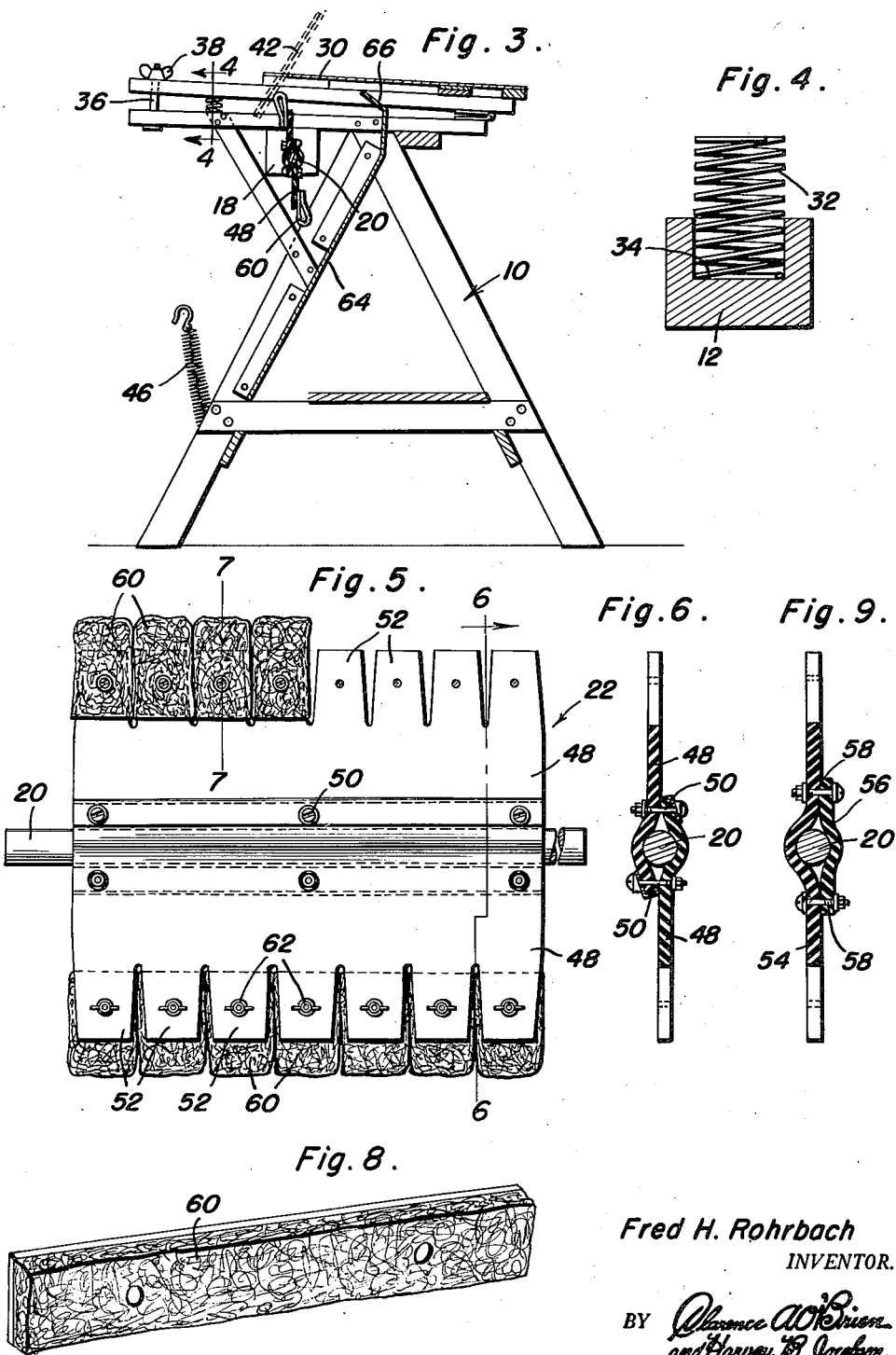

Patented Mar. 4, 1952

2,587,764

UNITED STATES PATENT OFFICE 2,587,764

RHUBARB CLEANING MACHINE

Fred H. Rohrbach, Kansas City, Kans.

Application January 4, 1950, Serial No. 136,725

1 Claim. (Cl. 146—49)

1

This invention comprises novel and useful improvements in a rhubarb cleaning machine and more specifically pertains to an apparatus for breaking and removing the skins or peels of rhubarb, onions or the like.

It is well known that certain vegetables such as rhubarb require their skins or peels to be removed before these vegetables are satisfactory for marketing. Heretofore, it was necessary to effect this peel-removing operation by manual labor, which was obviously time-consuming and tedious.

It is therefore an object of this invention to provide an apparatus which is capable of removing the peels or skins from rhubarb and similar vegetables in order to condition these vegetables for marketing; with a minimum of time and labor; and in a manner which is capable of accomplishment by unskilled labor, without injury to the vegetable and with inexpensive apparatus.

An important feature of this invention resides in the provision of a peel-stripping machine for rhubarb and similar vegetables which is provided with a pliable paddle for striking the stalks of rhubarb or the like; for breaking the peels or skin thereof; for stripping or removing these skins or peels by a clinging action of the paddle upon the same; and for discharging the discarded skins or peels in a convenient and satisfactory manner.

These, together with ancillary features and objects of the invention which will later become apparent as the following description proceeds, are attained by the present invention, a preferred embodiment of which has been illustrated, by way of example only, in the accompanying drawings, wherein:

Figure 3 is a vertical longitudinal sectional view taken substantially upon the plane indicated by the section line 3—3 of Figure 2;

Figure 4 is a vertical transverse sectional detail view taken substantially upon the plane indicated by the section line 4—4 of Figure 3 and showing a structural detail of the invention;

Figure 5 is a plan view of a peeling paddle, parts being removed therefrom, forming an element of this invention;

Figure 6 is a vertical transverse sectional view taken substantially upon the plane indicated by the section line 6—6 of Figure 5;

2

Figure 7:
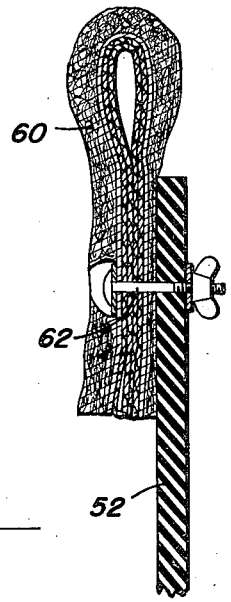

Figure 7 is a vertical transverse sectional detail view taken substantially upon the plane indicated by the section line 7—7 of Figure 5 and illustrating the construction of one of the flexible fingers of the paddle;

Figure 8 is a perspective view of a sheepskin strip forming the striking element of one of the paddle fingers; and Figure 9 is a view similar to Figure 6 but showing a modified construction of the paddle.

Referring now more specifically to the accompanying drawings wherein like numerals designate similar parts throughout the various views, it will be seen that the apparatus embodying the principles of this invention consists of a suitable supporting frame indicated generally by the numeral 10, and which is provided with a rigidly attached supporting platform 12 at its upper end of any desired construction, and a lower platform 14 upon which is mounted an electric motor 16 or any other suitable source of power.

Preferably, the platform 12 is of an open construction and is provided with depending brackets 18 between which is journaled a shaft 20 provided with a peeling paddle indicated generally by the numeral 22. The shaft 20 is coupled by a belt drive or any desired operating connection 24 with the electric motor for rotation therewith at any desired speed of rotation.

Hinged as at 26 to the upper surface of the platform 12 is a framework 28 to which is attached a cover 30. The latter is adapted to overlie the peeling paddle 22, as shown in Figure 3 and as set forth in detail hereinafter.

The framework, and consequently the cover 30 are yieldingly urged into an upward position with respect to the platform 12 as by means of compression springs 32 which are suitably secured in sockets 34 which are formed in the platform 12. This resilient upward movement of the frame 28 and cover 30 is adjustably regulated as by a clamping means consisting of bolts 36 extending through the platform 12 and the frame 28, and provided with wing nuts 38. By this means, the clearance between the cover 30 and the rotating peeling paddle 22 may be regulated and adjusted as desired.

Figure 2:
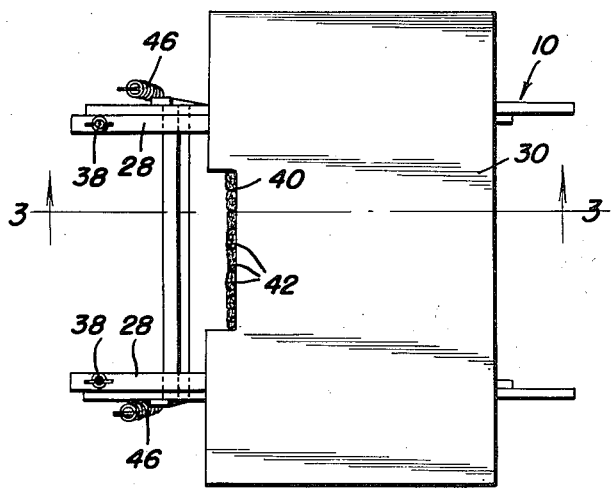
Figure 2 is a top plan view of the same.

As shown best in Figure 2, this cover 30 is provided with an opening 40 suitably disposed adjacent the peeling paddle 22 during its rotation, this opening conveniently comprising a notch 40 in the edge of the cover. As shown in Figure 3, and in Figure 2, it is intended to use this notch to insert stalks of rhubarb, or the like, as indicated at 42, in side-by-side relation in a vertically inclined position so that these stalks may be disposed in the path of travel of the rotating peeling paddle, as shown in Figure 3, whereby the latter may repeatedly impact against the stalks to break the skin or peel of the same and to strip this peel therefrom.

Figure 1:
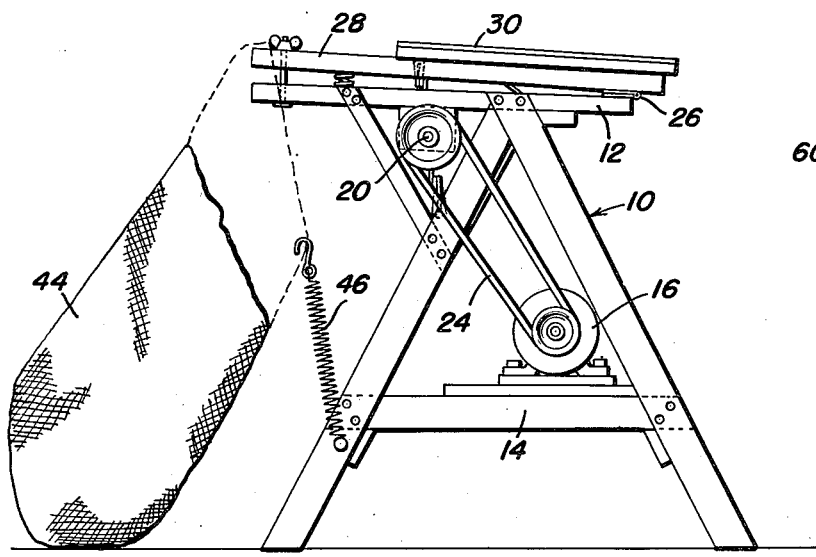
Figure 1 is a side elevational view of a suitable apparatus for carrying out the principles of this invention.

As shown best in Figure 1, it is intended to provide a receptacle such as a burlap sack or the like 44, although any suitable container could be employed, which is adapted to have its open end secured to the top of the frame 28, and by means of a spring 46, to have the lower edge of its open end distended in open position, this spring being secured to the supporting framework 10. In this position, the counter-clockwise rotation of the peeling paddle, together with the air current created thereby and guided by the lower surface of the cover 30, will direct stripped peels into this waste receptacle.

In order to effectively break the skin or peel of the stalks of rhubarb and other vegetables and remove the skin or peel without injuring the fleshy stalks, a resilient and improved construction of peeling paddle 22 is provided. In accordance with this invention, this resilient paddle may conveniently comprise, as shown in Figures 5 and 6, two or more sheets of pliable material 48, of rubber or the like, which at their adjacent ends are positioned to embrace the shaft 20 and are clamped thereon as by fastening bolts 50, so that these sheets will constitute vanes or paddles which are rotatable with the shaft. The outer edges of these sheets, as shown best in Figure 5, are provided with a plurality of laterally spaced, radially extending fingers 52 which are thus capable of independent flexing as the same engage the stalks of the vegetable being peeled.

Alternatively, as shown in Figure 9, one single sheet of material, such as rubber, or the like, and as indicated at 54, may be disposed across the shaft 20 and have its mid-portion resting thereon, while a clamping strip 56 is disposed upon the other side of the shaft and is clamped thereto and to the strip 54, as by clamping bolts 58. This sheet likewise is provided with the oppositely disposed finger portions as above set forth.

The above construction is sufficient to successfully break the peel or skin of the stalk, but is open to the objection that it does not effectively remove the broken skin or peel nor does it guard against injuring or damaging the fleshy stalk. To facilitate the removal of the broken skin or peel from the stalk and to prevent damaging the stalk itself, a pad is provided for each of the flexible fingers, this pad preferably comprising a strip of sheepskin as indicated at 60 in Figure 8. Each of the fingers 52 has secured to the striking surface of the same a striking element composed of the strip 60, this strip being folded upon itself with the fleeced portion on the outside, as shown in Figure 7, the looped end of the strip extending outwardly from the finger, while the overlapping ends of the strip are secured to the ends of the finger, as by a clamping bolt 62. The head of this bolt is drawn into the surface of the fleece, as shown in Figure 7, so that the striking surface of this sheepskin will have its fleeced portion engaged at each rotation with the surface of a stalk and by virtue of the clinging and yielding nature of the sheepskin, the fleecy portion thereof will cling to and strip the broken peel or skin from the stalk of the rhubarb or the like.

From the foregoing, it is thought that the construction and operation of the invention together with its many advantages will be readily apparent. In operation, a plurality of stalks will be disposed in the notched portion 40 whereby the same may be repeatedly struck by the rapidly rotating peeling paddle 22, the individual fingers of the same with their sheepskin contact elements breaking and stripping the peel from the stalks. The current of air created by the rotating paddles beneath the cover 30 will carry the broken portions of the peel and the discarded peel from beneath the cover 30 into the waste receptacle 44. Conveniently, a sheet metal guard or plate 64, see Figure 3, may be secured to the frame 10 and may be provided with an angulated upper end 66 terminating closely adjacent the under surface of the cover 30 to constitute a guard for the rotating peeling paddle as well as a guide for the air currents induced thereby.

Since numerous modifications and equivalents will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A vegetable peeling machine comprising a frame, a peeling paddle rotatably mounted on said frame, a vegetable support for positioning vegetable stalks in the path of travel of said paddle for breaking and stripping the peel therefrom, said support comprising a cover overlying said paddle, said cover having an opening therein for receiving vegetable stalks, said frame including a frame element hinged to a main portion of said frame, said cover being carried on said element, a bag disposed for receiving peels removed by said paddle, spring means urging said element upwardly from said frame, clamp means adjustably limiting said upward movement, means on said frame to hold one portion of the mouth of said bag, and an extending portion on said element opposed to said last mentioned means and comprising means to spread and hold another portion of the mouth of said bag.

FRED H. ROHRBACH.

REFERENCES CITED

The following references are of record in the file of this patent:

UNITED STATES PATENTS

| Number | Name | Date |
| --- | --- | --- |
| 63,320 | Southworth | Mar. 26, 1867 |
| 821,103 | Jetter | May 22, 1906 |
| 1,062,935 | Trust | May 27, 1913 |
| 1,481,547 | Garrette | Jan. 22, 1924 |
| 2,102,758 | Spayd | Dec. 21, 1937 |
| 2,456,446 | Rieske | Dec. 14, 1948 |

FOREIGN PATENTS

| Number | Country | Date |
| --- | --- | --- |
| 450,570 | Germany | 1927 |